2 Sheets—Sheet 1.

A. D. SHOEMAKER.
Combined Corn-Planter and Fertilizer Distributer.

No. 197,231. Patented Nov. 20, 1877.

Attest:
E. E. Court
Jno. P. Brooks

Inventor:
Alexander D. Shoemaker,
by Louis Bagger & Co.
Attys.

2 Sheets—Sheet 2.
A. D. SHOEMAKER.
Combined Corn-Planter and Fertilizer Distributer.
No. 197,231. Patented Nov. 20, 1877.
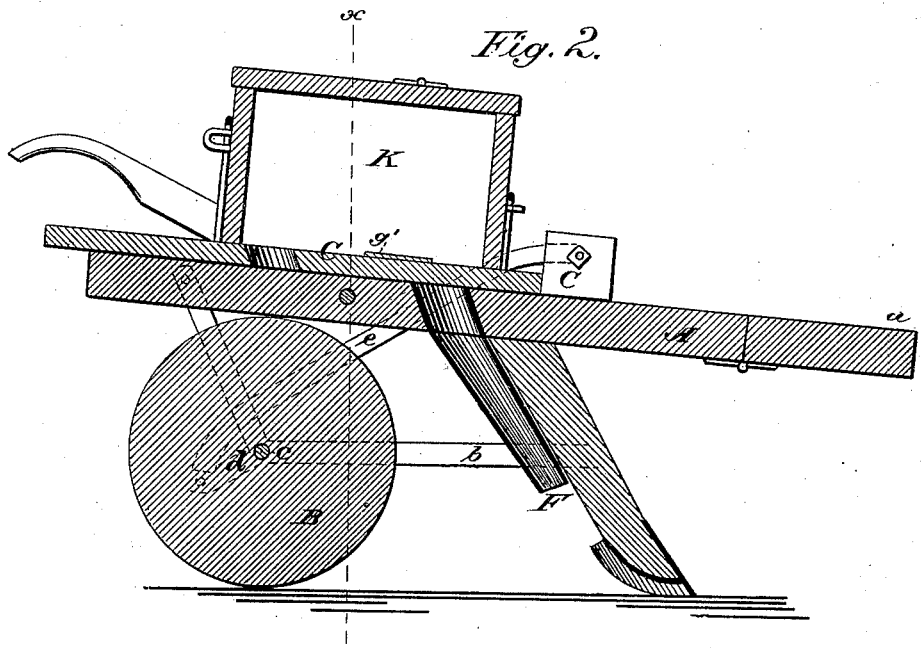
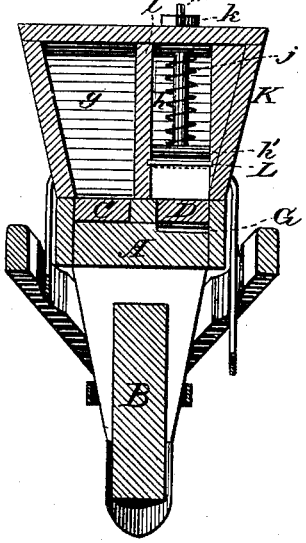
Attest:
E. E. Court.
Jno. P. Brooks.
Inventor:
Alexander D. Shoemaker,
by Louis Bagger & Co.,
Attys.

UNITED STATES PATENT OFFICE.

ALEXANDER D. SHOEMAKER, OF SPRING CHURCH, PENNSYLVANIA.

IMPROVEMENT IN COMBINED CORN-PLANTER AND FERTILIZER-DISTRIBUTER.

Specification forming part of Letters Patent No. 197,231, dated November 20, 1877; application filed April 9, 1877.

*To all whom it may concern:*

Be it known that I, ALEXANDER D. SHOEMAKER, of Spring Church, in the county of Armstrong and State of Pennsylvania, have invented certain new and useful Improvements in Combined Corn-Planter and Fertilizer - Distributer; and I do hereby declare that the following is a full, clear, and exact description thereof, which will enable others skilled in the art to which it appertains to make and use the same, reference being had to the accompanying drawings, which form a part of this specification, and in which—

Figure 1:
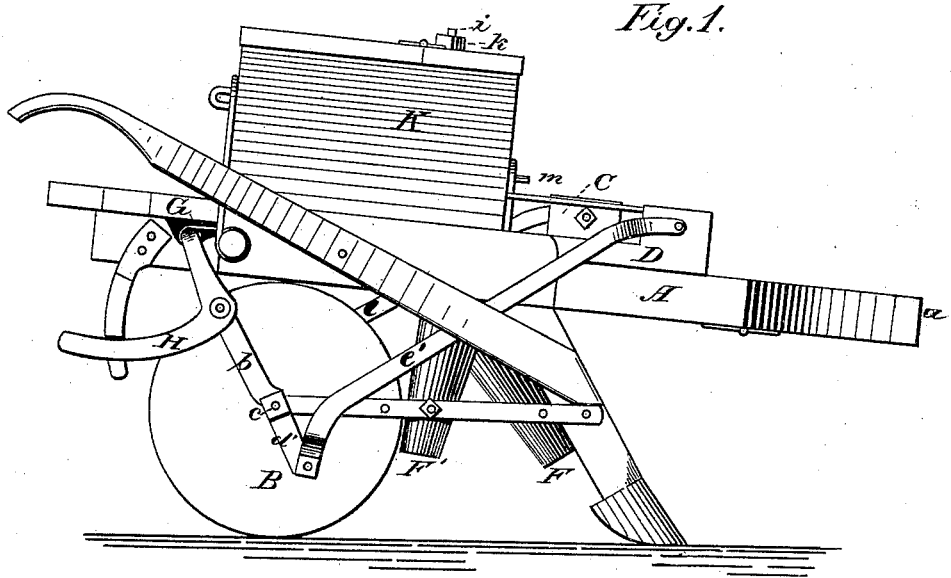
Figure 4:
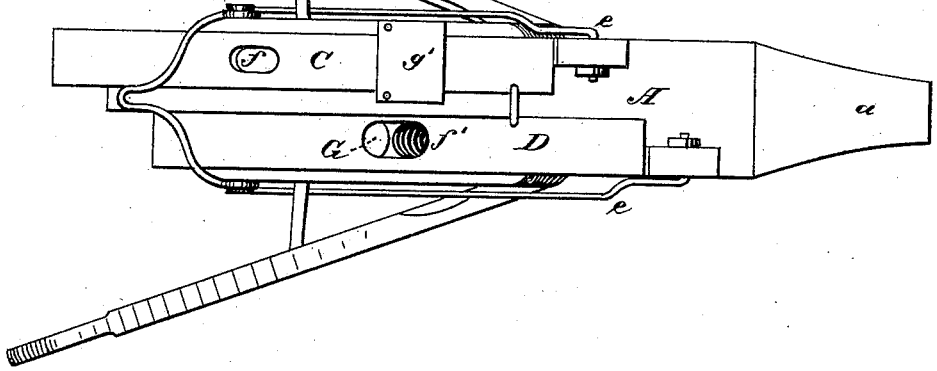

Figure 1 is a side elevation. Fig. 2 is a longitudinal section. Fig. 3 is a cross-section through the line $x\ x$, Fig. 2; and Fig. 4 is a plan view.

Similar letters of reference indicate corresponding parts in all the figures.

This invention relates to combined corn-planters and fertilizer-distributers; and it consists in the improved construction and arrangement of parts, hereinafter more fully shown and described.

In the drawing, A is the body or bed-plate of my improved planter, having, in front, the tongue $a$. The body A has, on each side, a bracket, $b$, projecting downward, so as to form bearings for the axle $c$ of the drive-wheel or disk B. Axle $c$ has two cranks, $d\ d'$, one on each side, and the cranks $d\ d'$ are connected by rods $e\ e'$ with the front ends of the feed-slides C D, which are thus operated.

The slides C D slide in suitable grooves or ways on top of bed-plate A, and are provided with perforations $f\ f'$, which carry the corn and fertilizing material to the feed-tubes. These tubes, which, in the drawing, are denoted by the letters F F', are secured to the under side of bed-plate A in any suitable manner, one of them, F, being secured permanently, with its opening or spout directly behind the cultivator-blade E, and the other, F', being hinged, so that its opening may be placed beside that of tube F, or some distance behind it, at the will of the operator.

When the tubes are in the first position—that is, beside each other—the cranks $d\ d'$ upon axle $c$ (one of which, $d'$, is adjustable) are placed in the same position, thus operating the feed-slides C D simultaneously in the same direction, the result of which is that the seeds and the fertilizing material are dropped together in the ground; but, if it is desired to deposit the fertilizing material on top of the ground, after the seeds are covered, the adjustable crank $d'$ is set at an angle to the opposite crank, and the tube F' is drawn back to the position shown in the drawing, Fig. 1. The result is that the fertilizing material, which is fed by the slide D, operated by rod $e'$ and crank $d'$, is dropped, not simultaneously with, but later than the grain, which is in the meantime covered by the soil. The position of the tube F' can be easily regulated so as to cause the fertilizing material to be deposited exactly on the top of each hill.

G is a thin sheet-metal slide, placed under the slide D, and operated by a bent lever, H. This slide can be made to cover the perforation in bed-plate A, through which the fertilizer is fed, thus cutting the supply of it off, whenever it is desired to do so.

K is the feed-box, which is secured upon bed-plate A, over slides C D. The box K is divided by a partition, $l$, into two compartments, $g\ h$, one of which is for corn, and the other for fertilizing material, the former compartment, $g$, being above slide C, and the latter, $h$, above slide D. The compartment $g$ has a half-bottom, $g'$, covering the part which comes above the feed-tube, for the purpose of preventing more grain from being fed at a time than the feed-cup $f$ in slide C can contain; and the compartment $h$ has a plate, $h'$, having a screw-threaded rod or bolt, $i$, which projects upward through the cover of the box, where it has a thumb-nut, $k$. A spring, $j$, is coiled around rod $i$, and serves to press plate $h'$ down as far as nut $k$ will permit.

When it is desired to feed but a small quantity of the fertilizing material the nut $k$ is so adjusted as to cause the plate $h'$ to be pressed by spring $j$ down against slide D; but, by operating the nut $k$ so as to raise plate $h'$ from slide D, the quantity may be increased to suit the operator.

In order to screen the fertilizing material, for the purpose of preventing the feed-tube F' from being choked or stuffed up when the material is fed freely, I arrange, in the compartment $h$, a screen or sieve, L, connected by a rod, m, to the front end of slide D. The screen L slides in suitable ways or grooves in the sides of compartment h.

When the slide D is operated it operates at the same time the sieve L, thus screening the fertilizing material, which is placed on top thereof, before it can be fed by the slide D.

The operation of my improved corn-planter and fertilizer-distributer will be readily understood from the foregoing description. When the machine is drawn over the ground the wheel or disk B will revolve, thus operating the feed-slides and the screen L in the manner and with the result already described. The supply of the fertilizing material may be easily regulated, and may, if desirable, be entirely cut off by the slide G.

Having thus described my invention, I claim and desire to secure by Letters Patent of the United States—

In a combined corn-planter and fertilizer-distributer, the bed-plate A, having brackets $b\ b$, axle or shaft $c$, wheel or disk B, crank $d$, and adjustable crank $d'$, in combination with the rods $e\ e'$, feed-slides C D, feed-tube F, and hinged adjustable feed-tube F', substantially as and for the purpose herein shown and specified.

In testimony that I claim the foregoing as my own I have hereto affixed my signature in presence of two witnesses.

ALEXANDER D. SHOEMAKER.

Witnesses:
 THOMAS A. COCHRAN,
 WM. HENRY.